C. F. PRESCOTT.
VALVE GEAR FOR ENGINES.
APPLICATION FILED SEPT. 3, 1909.
973,137.
Patented Oct. 18, 1910.
3 SHEETS—SHEET 3.
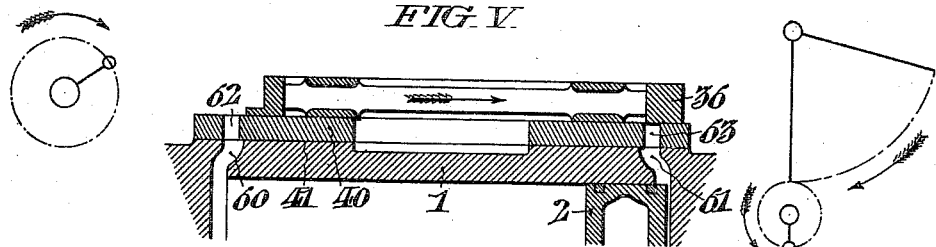
FIG. V.
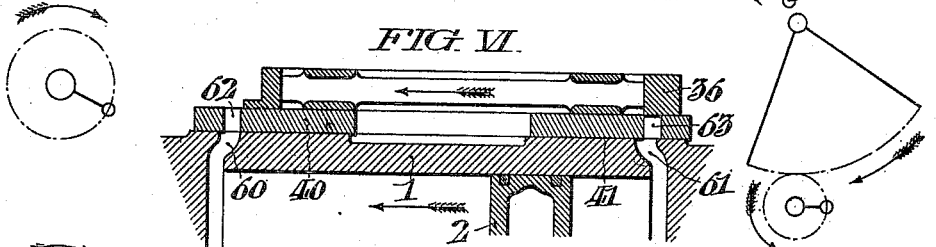
FIG. VI.
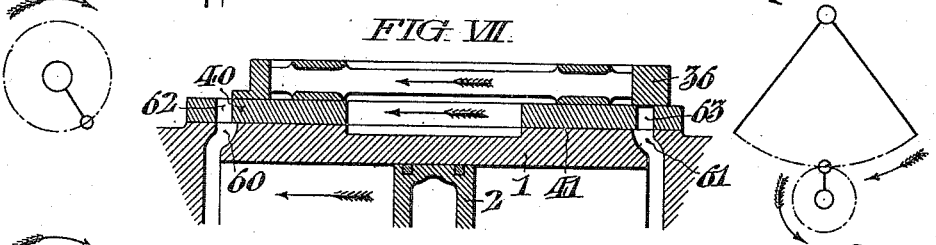
FIG. VII.
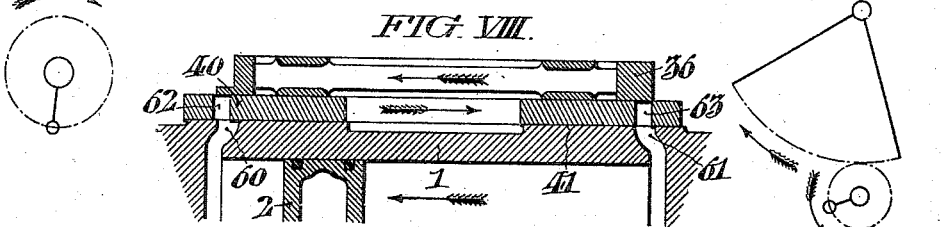
FIG. VIII.
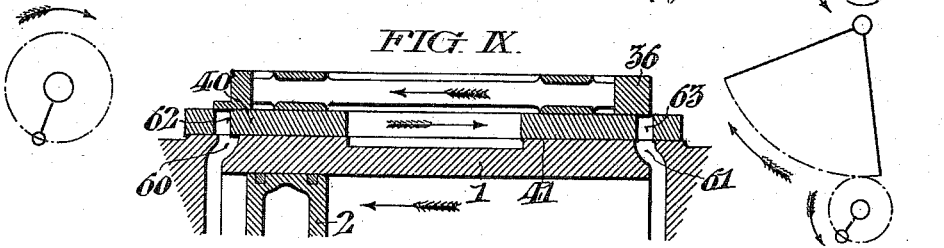
FIG. IX.
WITNESSES:
John C. Bergner.
James H. Bell.
INVENTOR:
Charles F. Prescott,
by his Attorneys
Seeley & Paul

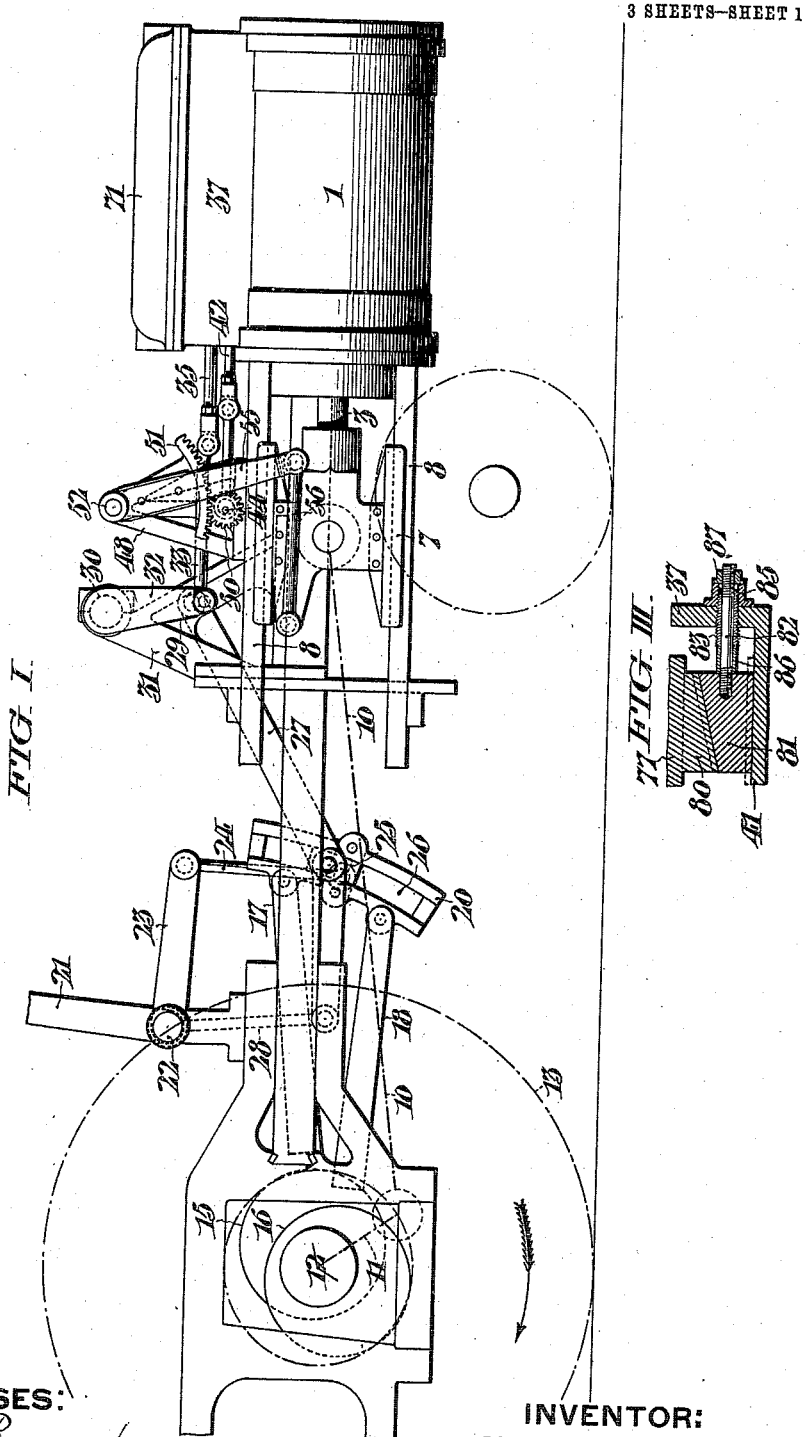

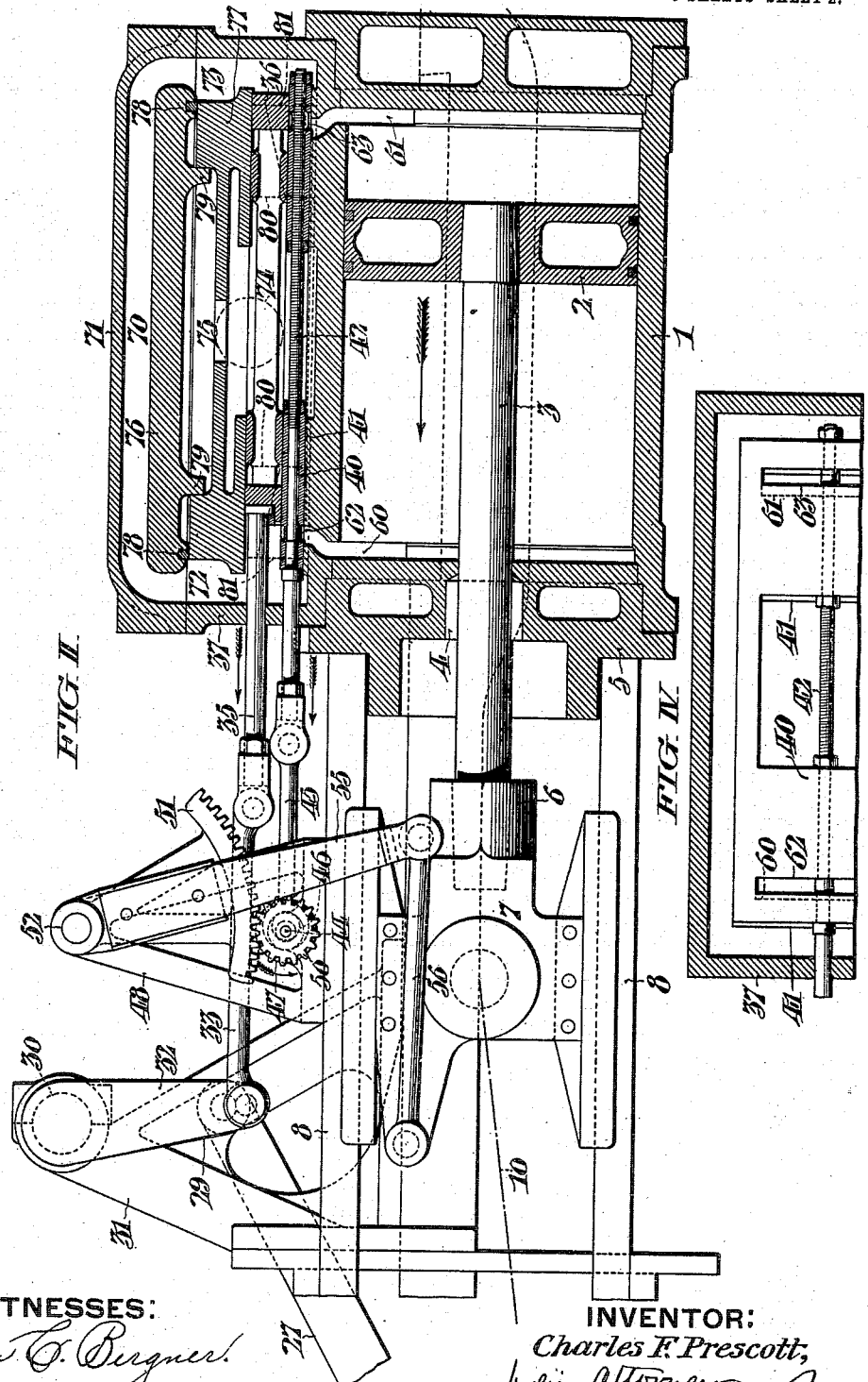

UNITED STATES PATENT OFFICE.

CHARLES F. PRESCOTT, OF PHILADELPHIA, PENNSYLVANIA.

VALVE-GEAR FOR ENGINES.

973,137.   Specification of Letters Patent.   Patented Oct. 18, 1910.

Application filed September 3, 1909. Serial No. 516,044.

*To all whom it may concern:*

Be it known that I, CHARLES F. PRESCOTT, of Philadelphia, in the county of Philadelphia and State of Pennsylvania, have invented certain new and useful Improvements in Valve-Gears for Engines, whereof the following is a specification, reference being had to the accompanying drawings.

My invention relates to a valve gear for engines by means of which the efficiency of the engine is increased. I accomplish this end by the use of a slide valve coöperating with ports which move independently of the motion of the valve. The particular device employed to render movable the ports, in the embodiment of my invention which I will describe, is what I term a false valve seat. To this false or movable valve seat I impart independent motion by means of suitable actuating mechanism, the resultant of the differing motions of the valve and valve seat combining to produce a more rapid opening and closing of the admission port and likewise of the exhaust port. By my device I also secure an increased period of expansion and a decreased period of compression due to the relatively greater valve travel at short cutoff.

It will be understood that my invention is applicable to any engine in which a valve gear is employed to admit fluid pressure alternately to the ends of a piston cylinder. It must also be understood that my invention is not confined to the particular form of false valve seat or to the particular valve gear hereinafter described, nor to a valve reciprocating longitudinally as distinguished from one reciprocating in the arc of a circle. It applies to other means for securing independent movement of both ports and valve, and for so actuating these independently movable parts as to modify the events characteristic of the ordinary slide valve operation as to produce the result which I secure.

In the accompanying drawings, Figure I, is a diagrammatic elevation of certain parts of a locomotive engine sufficient to illustrate the application of my invention thereto. Fig. II, is an enlarged longitudinal section of the cylinder showing also in elevation some of the adjacent parts of the valve gear. Fig. III, is a detail sectional view showing the method of adjusting the spacing plate of the steam chest. Fig. IV, is a partial horizontal section taken immediately above the false valve seat. Figs. V, to IX, inclusive are successive sections with diagrammatic accompaniments illustrating the events of the valve as modified by my device.

In the drawings, 1, indicates the steam cylinder, within which reciprocates the piston 2, whose rod 3, passes through a suitable stuffing box 4, in the head 5, of the cylinder. The outer end of the piston rod 3, is secured within the extension 6, of the cross head 7, which is guided between slides 8, 8. A connecting rod indicated conventionally by a dot and dash line 10, is pivoted at one end to the cross head 7, and at the other end to a crank 11, upon the driving shaft 12, also conventionally illustrated by a dot and dash line. The drivers secured to the shaft 12, are indicated by the circle 13, in Fig. I. The valve gear shown in connection with these parts is of the Stephenson reversible type, and comprises paired eccentrics 15, and 16, symmetrically spaced with respect to the crank 11, about the driving shaft 12. The eccentric rods 17, and 18, are pivotally attached to a link 20, in proximity to its ends. The link may be raised or lowered by means of a lever 21, which is fulcrumed upon a shaft 22, to which is secured a laterally extending arm 23, whose outer end is attached to the link 20, by means of a connector 24. A slide block 25, engages the slot 26, in the link 20, and is pivotally attached to a transmission bar 27. The left hand end of the transmission bar is pivoted to a link 28, which depends from the shaft 22, already mentioned, rocking freely thereon. The right hand end of the transmission bar 27, is pivoted to an arm 29, rocking upon a shaft 30, journaled in a bearing upon the standard 31. By reason of the connections of the transmission bar 27, with the shaft 22, and the rocker arm 29, the slide block 25, is maintained in substantially the same horizontal plane irrespective of the motion of the link 20, and the movement of the eccentrics is thus imparted in a well known manner to the rock shaft 30. Attached to said shaft is a second rocker arm 32, which transmits the motion of the eccentrics through a connecting link 33, to the rod 35, of a slide valve 36, operating within a steam chest 37, formed at the top of the cylinder 1.

The parts and valve gear thus far described are all of well known construction, except that the valve stem has a relatively greater travel imparted to it, this being permitted by reason of the movable valve seat about to be described. To these parts there are added according to my invention a false valve seat and its actuating mechanism as now to be described.

*False valve seat.*—This is a device to make possible movement of the cylinder ports, which by coöperation with the main steam valve accomplishes the modification of the events thereof to secure the end of my invention. Other forms of similarly movable ports may be employed, but I will confine my description to the false valve seat shown in the drawings.

The false valve seat 40, consists of a rectangular plate interposed between the cylinder ports and the slide valve. It is provided with slots forming movable ports which register or coöperate with the fixed ports 60, and 61, at the ends of the cylinder. It slides within a seat or slideway 41, formed upon the top of the cylinder. It is secured to and permanently adjusted upon a central rod 42, by means of which a reciprocatory motion is imparted to it as hereinafter to be described. It is provided with the ports 62, and 63, as shown in Figs. IV, and V. The exhaust chamber 70, in the top 71, of the steam chest 37, communicates at its ends 72, and 73, with the cylinder ports 60, and 61, respectively as permitted by the coöperation of the ends of the slide valve and the ports 62, and 63, formed in the false valve seat. Fluid pressure is admitted through a supply pipe 74, into the chamber 75, formed by the co-action of a partition 76, cast integrally with the cover 71, of the steam chest, and the opening within a pressure plate 77, whose lower face forms the sliding surface for the top of valve 36. Lugs 79, depending from the partition 76, engage the inner edges of the plate 77, and communication between the pressure chamber and exhaust passages is prevented by packing 78, interposed between plate 77, and partition 76, of the chest cover. The steam chest 37, is so designed that the steam chamber is entirely surrounded by the exhaust passages, so that the walls of the said chamber are not directly in contact with the atmosphere. It is obvious that this arrangement is effective in reducing the heat losses of the engine.

By reference to Fig. II, it will be seen that the area of plate 77, exposed to the steam pressure within chamber 75, is somewhat greater than that of the central opening of the slide valve 36, which results in the maintenance of a steam tight joint between them. In order to maintain this steam tight joint at the top surface of the valve and to avoid any possibility of jamming at the region of this joint, and at the same time to permit the taking up of the wear between the sliding surfaces, I provide plate 77, near its ends with a plurality of depending lugs 80, having inclined lower surfaces adapted to be engaged by adjustable wedges 81, as shown in dotted lines in Fig. II, and more clearly illustrated in the section of Fig. III. Secured within the ends of the wedges 81, are stud bolts 82, which pass through adjustable bushings 83, threaded into the walls of the steam chest 37. The said bushings are provided with adjusting nuts 85, which are adapted to be jammed against the exterior face of the steam chest after the desired setting of the said bushings. Spacing sleeves 86, are interposed between the inner ends of the bushings 83, and the wedges 81. At their outer ends the stud bolts 82, are provided with nuts 87, which are jammed against the outer faces of the nuts 85, already described. When it is desired to adjust the wedges 81, the nuts 85, and 87, are loosened and the threaded sleeves 83, turned until the desired position is found, whereupon the nuts 85, are again tightened. Readjustment of the nuts 87, results in the drawing of the wedges 81, to their new position, and it will be seen that when so located the spacing sleeves 86, are securely clamped between the said wedges and the inner ends of the bushings 83, so that any accidental derangement is absolutely prevented.

Fluid pressure in the chamber 75, is admitted through the cylinder ports 60, and 61, to the cylinder as permitted by the co-operation of the slide valve with both the movable ports 62, and 63, of the false valve seat.

*The actuating mechanism for the false valve seat.*—According to my invention I impart to the false valve seat an irregular reciprocatory motion which is so correlated to the reciprocation of the main piston as to secure one complete reciprocation of the false valve seat to a half reciprocation of the piston. Various other devices may be employed in order to secure this correlated motion, but I will describe only the one shown in the drawings.

The rod 42, to which the false valve seat is secured, passes through the end of the exhaust chest and is pivotally connected at its outer end with the eccentric rod 45, the strap of which is in operative connection with an eccentric 46, on the shaft 44, journaled in a bearing 47, formed in standard 48. Upon the shaft 44, is set a pivoted pinion 50, which is in engagement with a sector 51, the edge of which is geared or racked, and which is fast on the rock shaft 52, journaled in a bearing formed at the top of the standard 48, already referred to. The shaft 52, receives a rocking motion through an arm 55, secured thereon, the end of which is pivotally attached by means of a link 56, to the cross head 7. By means of these connections the reciprocation of the rocking sector 51, is synchronous with that of the cross head, consequently the pinion 50, is momentarily stationary, when the cross head reaches the extremity of its stroke in either direction. As shown in the drawings the pinion is so geared as to make one complete rotation for each stroke of the piston to which the cross head is attached, this rotation being alternately in opposite directions depending upon the direction in which the cross head is moving. Under certain conditions it is advantageous to vary this gear, so that more or less than one complete rotation is accomplished for each stroke of the piston. The eccentric 46, is so related to the pinion 50, that the dead center positions are advanced a quarter rotation from the position in which the pinion is in engagement with either extremity of the sector, the eccentricity amounting to about one-fourth of the steam lap on the main valve, the result being that for each stroke of the piston, there are four positions in which the false valve seat 40, is momentarily stationary, the two coinciding with the extremities of the stroke, and two coinciding with the opposed dead center positions of the eccentric upon the shaft of the pinion 50, and between these stationary positions the false valve seat is moved in successively reversed directions.

It is difficult to fully illustrate the somewhat complex motions which result from the gear thus described, and which by their coöperation with the respective reciprocating motions of the slide valve and piston control the driving of the piston, nor is it important to describe minutely all of these motions. It will be sufficient to briefly refer to certain features which are most directly connected with the advantages secured by my valve gear as compared with the ordinary slide valve motions. Among the advantages thus secured are quick opening and closing of the admission and exhaust ports, a greater opening of the exhaust port at the highest piston speed of the engine when using short cut-off, due to the increased travel of the slide valve. By following the diagrams which constitute Figs. V, to IX, the relative motions of the parts to secure these ends will be better understood, the positions of the figure being chosen to illustrate the events at the following piston positions, namely, in Fig. V, the piston at the beginning of its stroke; Fig. VI, at 25% stroke; Fig. VII, at 50% stroke; Fig. VIII, at 80% which is the point of release, and Fig. IX, at 90%, when compression begins. The motions of the parts occurring between these positions can readily be understood by consideration of the diagrams to the right and left of each figure, illustrating respectively the contemporaneous position of the valve gear by which the false valve seat is controlled, and of the virtual eccentric by which the slide valve is controlled. In Fig. V, the piston is about to commence its stroke from right to left, the false valve seat is stationary due to the reversing of the motion of the sector, while the slide valve is traveling to the right to full opening. The exhaust port is fully open. Admission has already begun and has established the lead opening for steam. At the time of the beginning of admission, the valve seat was traveling to the left in opposition to the motion of the valve as indicated by the arrow, these opposed motions accelerating the opening for admission. This acceleration is also increased by the increased valve travel which produces a more rapid motion of the valve to effect admission. Between Figs. V, and VI, the false valve seat moves to the right, while the valve passes to the right to the point of full admission and returns to the left to the point of cut off. During this interval the exhaust is fully open, at left end of cylinder. The coincidence of the motions of the valve and valve seat toward the right to the point of full admission produces a prolonged period of large admission, while the opposition of the motion of these parts immediately preceding the point of cutoff causes a rapid cutoff. In Fig. VI, the point of cutoff has just been reached at one quarter stroke. The false valve seat is stationary, its eccentric being at the dead center, while the valve is moving rapidly toward the left. Between Figs. VI, and VII, both parts travel to the left and at differing speeds. The admission port is maintained closed. Expansion proceeds and a large opening is maintained for exhaust. At Fig. VII, the half stroke is shown the parts being as just explained. Between Figs. VII, and VIII, the valve continues its travel to the left but the false valve seat passes first to its extreme left hand position and at the three-quarter stroke begins its motion to the right in opposition to the motion of the valve thus coöperating to accelerate release and also closure of the exhaust port. At Fig. VII, the point of release is shown at 80% which gives a longer period of expansion than with the ordinary motion. This delay of the point of release and lengthening of the expansion period, is due to the coincident motions of the valve and false valve seat up to the three quarter stroke. At this position the exhaust is about to close and compression to begin. At Fig. IX, which is the 90% position, release continues, and the valve is traveling to left to open the exhaust at which point both parts will be moving in the opposite directions to accelerate this opening. The exhaust has closed and compression begins. The valve is somewhat less in length than the distance between the exhaust edges of the false valve seat. In other words it has exhaust clearance on each end, so that during the time the valve is traveling the distance represented by twice its exhaust clearance the piston has advanced 10% of its stroke, or from 80% to its 90% position. From this point on, the events of the right hand end of the valve are precisely duplicated in the events of the left hand end, so that the description of the latter beginning at Fig. V, will complete the cycle.

From the foregoing it will be seen that the required conditions for the economical use of steam in an engine cylinder are more nearly fulfilled by my invention than in other devices. For it must be noted that I so actuate the false valve seat that the maximum mean effective pressure may be had from any given quantity of steam with a relatively low terminal pressure of exhaust, while at the same time, I preserve the simplicity of construction of the ordinary high speed engine, which is lost when additional steam valves are employed.

Having thus described my invention, I claim:—

1. In an engine, the combination of a piston cylinder provided with movable ports always communicating freely with the cylinder; a reciprocating valve controlling said ports; and means for imparting to the ports a reciprocatory motion whereby the events of the valve are modified in the interest of economy of steam consumption.

2. In an engine, the combination of a piston cylinder provided with ports; reciprocating slide valve for the control of said ports; a ported sliding valve seat interposed between the cylinder ports and the slide valve the ports of said valve seat always communicating freely with the cylinder ports; and means for imparting a reciprocatory motion to said sliding valve seat.

3. In an engine, the combination of a piston cylinder provided with movable ports; a reciprocating valve controlling said ports; and means for imparting to the ports a reciprocatory motion which is completed once for each half-reciprocation of the piston.

4. In an engine, the combination of a piston cylinder provided with movable ports; a reciprocating valve controlling said ports; and means for imparting to the ports an irregular reciprocatory motion so correlated to the piston stroke as to rest four times for each stroke with successive reversal of the direction of motion after rest.

5. In a valve gear for engines having a piston cylinder provided with movable ports; a valve controlling said ports; and means for imparting independent reciprocatory motion to both the valve and ports, the resultant of their differential reciprocation producing quick motions to open and close the admission and exhaust.

6. In a valve gear for engines, a slide valve for the control of the cylinder ports; a ported sliding valve seat interposed between the cylinder ports, and the slide valve; and means for imparting an irregular reciprocatory motion to said sliding valve seat dependent upon the reciprocation of the piston and including an eccentric rotated by a pinion geared to a rack which reciprocates synchronously with the piston.

7. In a valve gear for engines having a piston cylinder provided with movable ports; a reciprocating valve controlling said ports; and means for imparting independent reciprocatory motion to said ports, whereby the opening and closing of the exhaust is delayed.

In testimony whereof, I have hereunto signed my name, at Philadelphia, Pennsylvania, this second day of September 1909.

CHARLES F. PRESCOTT.

Witnesses:
 JAMES H. BELL,
 E. L. FULLERTON.